(12) United States Patent
Baumann et al.

(10) Patent No.: US 6,835,305 B1
(45) Date of Patent: Dec. 28, 2004

(54) LIQUID FILTER, ESPECIALLY AN OIL FILTER

(75) Inventors: Peter Baumann, Stuttgart (DE);
Thomas Brieden, Waiblingen (DE);
Hans Gebert, Heilbronn (DE); Benoît Monzie, Stuttgart (DE)

(73) Assignee: Mahle Filtersysteme GmbH, Stuttgart (DE)

( * ) Notice: Subject to any disclaimer, the term of this patent is extended or adjusted under 35 U.S.C. 154(b) by 120 days.

(21) Appl. No.: 10/111,472

(22) PCT Filed: Sep. 30, 2000

(86) PCT No.: PCT/DE00/03508

§ 371 (c)(1),
(2), (4) Date: Apr. 23, 2002

(87) PCT Pub. No.: WO01/30478

PCT Pub. Date: May 3, 2001

(30) Foreign Application Priority Data

Oct. 23, 1999 (DE) .......................................... 199 51 084

(51) Int. Cl.⁷ ............................................. B01D 35/34
(52) U.S. Cl. ...................... 210/133; 210/136; 210/232; 210/248; 210/433.1; 210/443
(58) Field of Search ................................ 210/133, 136, 210/232, 248, 440, 443, 433.1

(56) References Cited

U.S. PATENT DOCUMENTS

| 4,698,164 A | 10/1987 | Ellis | |
|---|---|---|---|
| 5,516,425 A | * 5/1996 | Brieden et al. | 210/232 |
| 5,589,060 A | * 12/1996 | Gebert et al. | 210/130 |
| 5,814,215 A | 9/1998 | Jensen et al. | |
| 5,972,210 A | 10/1999 | Munkel | |

FOREIGN PATENT DOCUMENTS

| DE | 1152285 | 2/1964 |
|---|---|---|
| DE | 39 03 675 | 8/1990 |
| DE | 42 40 656 | 7/1993 |
| DE | 94 11 212.6 | 10/1994 |
| DE | 43 44 586 | 6/1995 |
| DE | 196 13 101 | 10/1997 |
| DE | 197 54 243 | 6/1999 |
| DE | 198 04 329 | 8/1999 |
| DE | 198 35 525 | 10/1999 |
| EP | 0640369 | 3/1995 |
| EP | 0 874 140 | 10/1998 |

* cited by examiner

Primary Examiner—Matthew O. Savage
(74) Attorney, Agent, or Firm—Collard & Roe, P.C.

(57) ABSTRACT

The invention relates to a especially an oil filter for cleaning lubricating oil, especially for internal combustion engines of automobiles, comprising a filter housing which is positioned essentially upright when installed, which contains a filter receiving area for accommodating a ring-shaped filter insert in an upper section and which contains an inlet channel for unclean liquid, which connects a supply line of the liquid filter to an unclean side of the ring-shaped filter insert in the filter receiving chamber and an outlet channel for clean liquid, which connects a clean side of the ring-shaped filter insert in the filter receiving area to a discharge line of the liquid filter, in a lower section. The invention provides for a functional support insert which can be inserted into the support receiving area formed in the lower section of the filter housing and which contains the outlet channel, in order to simplify the production of the liquid filter.

10 Claims, 2 Drawing Sheets

LIQUID FILTER, ESPECIALLY AN OIL FILTER

CROSS REFERENCE TO RELATED APPLICATIONS

Figure 1:
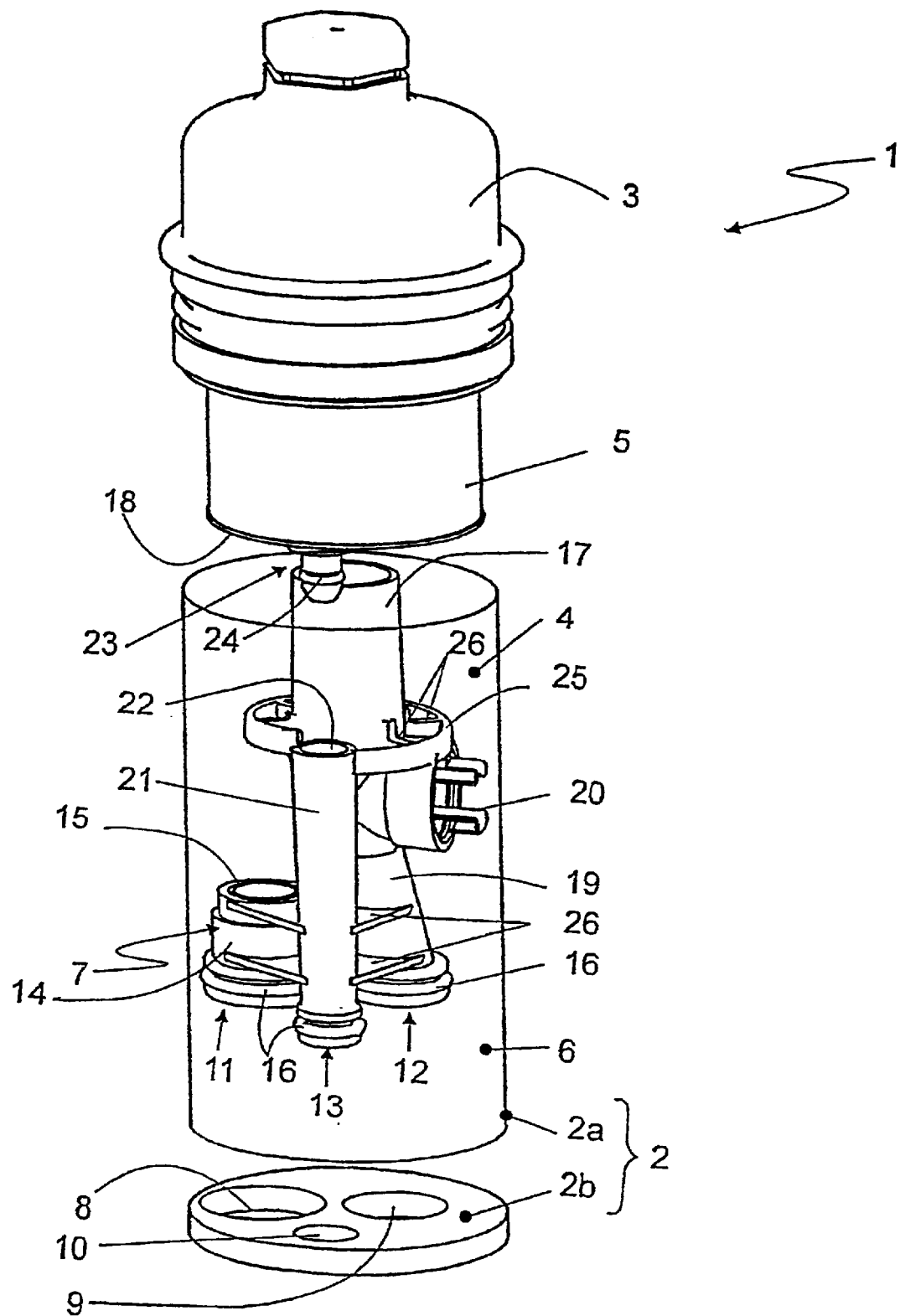

Applicants claim priority under 35 U.S.C. §119 of German Application No. 199 51 084.9 filed Oct. 23, 1999. Applicants also claim priority under 35 U.S.C. §120 of PCT/DE00/03508 filed Sep. 30, 2000. The international application under PCT article 21(2) was not published in English.

This invention relates to a liquid filter, especially an oil filter, for cleaning lubricating oil, especially for internal combustion engines in motor vehicles, having the features of the definition of the species of claim 1.

German Patent 39 03 675 C2 describes an oil filter of this type, having a filter housing which is essentially upright when in stalled and which contains a filter receiving space to accommodate a ring-shaped filter insert in an upper section and which contains in a lower section an inlet channel for uncleaned oil and an outlet channel for purified oil. The inlet channel connects an inlet line of the oil filter, which is connected to a pressure side of an oil pump, to a crude side of the ring-shaped filter insert in the filter receiving space. The outlet channel connects a clean side of the ring-shaped filter insert in the filter receiving space to an outlet line of the oil filter communicating with the lubricant sites of an internal combustion engine.

A liquid filter of the type defined in the preamble is essentially known from European Patent Application 0 874 140 A1 and in addition to the features mentioned above, it has an oil cooler which is inserted into an oil cooler receiving space designed in the lower section of the filter housing and is screwed to the filter housing. The oil cooler contains the outlet channel and remains in the filter housing when the ring-shaped filter insert is changed.

U.S. Pat. No. 5,814,215 describes another liquid filter, where a central supporting element is attached to the inside of a cover which is screwed removably onto the filter housing. This carrier element is designed internal groove in an axial section near the cover. The ring-shaped filter insert can be attached to the carrier element on the side facing away from the cover. The filter housing has a central recess like a blind hole to which the return line is connected centrally at the bottom and the drain line is connected at the side above it. The carrier element has an axial section which projects axially above the ring-shaped filter insert at a distance from the cover, penetrating into the recess when the cover is screwed onto the filter housing. The projecting axial section has on the free end a sealing stopper for tightly sealing the return line. The axial section of the carrier element penetrating into the recess also has a sealing section which seals the recess with respect to the interior of the filter housing above the drain line. Within the carrier element, a flow path is achieved which connects the clean side of the interior of the axial section designed as an inner groove to the recess in the housing. To change the ring-shaped filter insert, the cover is unscrewed from the filter housing, lifting the carrier element connected to it. In this way, the sealing stopper is removed from the return line, so that the filter housing can be emptied completely before removing the cover. After removing the carrier element from the filter housing, the ring-shaped filter insert on the carrier element can be replaced.

With the known liquid filters, the filter housing is manufactured in one piece with the channels integrated into it as an injection molded part. The inside of the housing must then be finished to provide a smooth surface for gaskets, for example. Likewise, careful machining of the surface is necessary to permit insertion of the ring-shaped filter insert here, so that its central interior can form a tight seal with the corresponding channel, namely the outlet channel on the clean end.

The present invention is concerned with the problem of designing a filter of the type defined in the preamble with regard to simplified machining.

This problem is solved according to this invention by a liquid filter having the features of claim 1.

This invention is based on the general idea of combining in a separately manufactured function carrier insert the parts of the filter housing which are manufactured in one piece together with the filter housing in the case of a traditional filter housing and which must be finished to fulfill their function. On the one hand, this yields the possibility of external finishing of these function elements, while on the other hand, the function carrier insert can also be manufactured in such a way that finishing can be omitted. For example, if the function carrier insert is made of plastic, it may be manufactured by an injection molding method, for example. The resulting surface quality is sufficiently high so that finishing can be omitted in most cases.

The function elements integrated into the function carrier insert include at least the outlet channel which connects the clean side of the ring-shaped filter insert in the filter receiving space to the outlet line of the liquid filter. Likewise, the following function elements can be integrated into the function carrier insert: the inlet channel connecting the inlet line of the liquid filter to the crude side of the ring-shaped filter insert in the filter receiving space and/or an emptying channel that allows the liquid to flow out of the filter receiving space and/or a return-flow-blocking valve which is provided with the inlet channel and/or a pressure-regulating valve connecting the outlet channel to the emptying channel, as a function of pressure, and/or a bypass valve connecting the inlet channel to the outlet channel as a function of pressure. The more function elements of the filter housing are integrated into the function carrier insert, the greater are the advantages of this invention, so that less finishing work is necessary for the filter housing.

In a preferred embodiment, a carrier holding space into which the function carrier insert is inserted in the lower section of the filter housing forms the inlet channel, so that the unclean liquid flows around the function carrier insert and the ring-shaped filter insert on the outside. Due to this design, the carrier holding space provided for the function carrier insert can be used as a function element, so that it has a double function in this regard.

Other important features and advantages of the device according to this invention are derived from the subclaims, the drawings and the respective description of the figures on the basis of the drawings.

It is self-evident that the features mentioned above and those to be explained below can be used not only in the combination indicated but also in other combinations or alone without going beyond the scope of the present invention.

Figure 2:
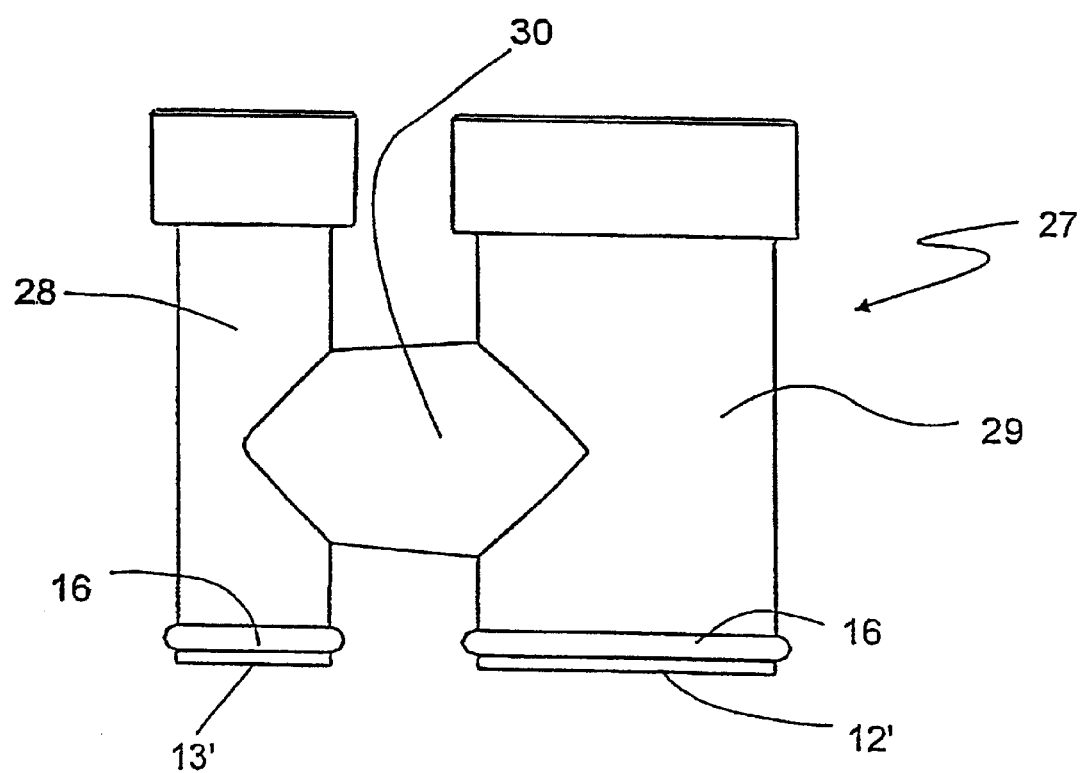

A preferred embodiment of this invention is illustrated in the drawings and described in detail in the following description:

The drawings show schematically:

FIG. 1 a perspective view of a dismantled arrangement of the individual components of a liquid filter according to this invention, and FIG. 2 a side view of an additional component.

According to FIG. 1, a liquid filter 1 according to this invention has a filter housing 2, which is expediently manufactured in one piece, especially as a pressure cast aluminum component. However, a cylindrical tube component 2a and a socket component 2b which connects to the former from beneath are shown separately from one another for better illustration. The unit of these two components is represented in FIG. 1 by a brace-type bracket. The tube component 2a is also shown as transparent to give an improved representation. The filter housing 2 can be sealed at its top side by a cover 3 which can be screwed onto it.

A filter receiving space 4 is formed in an upper section of the tube component 2a and a ring-shaped filter insert 5 can be inserted into it when filter 1 is assembled. In the present embodiment, the ring-shaped filter insert 5 is designed so that the liquid to be cleaned passes through it radially from the outside to the inside. The ring-shaped filter insert 5 is secured axially and mounted so it can rotate in the interior of the cover 3, so that the ring-shaped filter insert 5 is inserted into the filter housing 2 at the same time as the cover 3 is placed on the housing, as illustrated in FIG. 1.

In another section of the tube component 2a, a carrier holding space 6 is formed in which a function carrier insert 7 is accommodated in the assembled state of the filter 1. In the socket component 2b there are several lines that are open at the top, namely an inlet line 8, which communicates with a pressure side of an oil pump, for example, an outlet line 9 which communicates with the corresponding lubrication points of an internal combustion engine, and a return line 10 which communicates with a relatively pressureless reservoir, such as an oil pan, for example. Lines 8, 9, 10 which are open at the top form receptacles for the corresponding connections 11, 12, 13 which are formed on the function carrier insert 7. Sealing agents which act radially, O rings 16 in the present case, guarantee effective sealing of the connections 11, 12, 13 in the respective lines 8, 9, 10.

The function carrier insert 7 has an inlet channel section 14 which contains a return-flow-blocking valve 15 and can be inserted with the connection 11 into the opening in the inlet line 8. In this way, the unclean oil (crude oil) passes through the return-flow-blocking valve 15 into the carrier holding space 6 and into the filter receiving space 4 and thus flows around the function carrier insert 7 and the ring-shaped filter insert 5. In this embodiment, the carrier holding space 6 therefore forms an inlet channel for uncleaned liquid which connects the inlet line 8 of the be filter 1 to an unclean side of the ring-shaped filter element 5 in the filter receiving space 4.

On its upper end, the function carrier insert 7 has a central connection 17 on which the ring-shaped filter insert 5 is placed, thus forming a communicating connection to an interior space of the ring-shaped filter insert 5 which forms the clean side of the ring-shaped filter insert 5. To this end, the ring-shaped filter insert 5 preferably contains a lower end disk 18 which is equipped with a central opening and with appropriate sealing means.

This function carrier insert 7 also has an outlet channel 19 which is equipped at one end with the central connection 17 and at the other end with the connection 12, so that when the outlet channel 19 is inserted with its connection 12 into the opening in the outlet line 9, it connects the clean side of the ring-shaped filter insert 5 to the drain line 9 of the filter 1 over the central connection 17. Between its ends, the outlet channel 19 has a bypass valve 20 which opens above a threshold value for a crude oil pressure in the inlet channel or in the carrier holding space 6 and connects the carrier holding space 6 to the outlet channel 19, so that crude oil can flow into the clean side, bypassing the ring-shaped filter insert 5 when there is a critical increase in pressure, i.e., it can flow out to the cleaned oil (clean oil) in the outlet line 9.

The function carrier insert 7 also has an emptying channel 21 which has the connection 13 at its lower end and has an opening 22 at its upper end into which a journal 23 penetrates with a seal when the ring-shaped filter insert 5 is inserted into the filter housing 2, said journal being equipped with suitable sealing means, e.g., an O ring 24. The journal 23 here is designed on the end disk 18 and stands away from it downward axially and eccentrically. The ring-shaped filter insert 5 is coupled to the cover 3 in such a way that when the cover 3 is removed from the housing 2, the ring-shaped filter insert 5 is at the same time pulled out of the housing 2. Then journal 23 releases the opening 22 of the emptying channel 21, so that the filter receiving space 4 can be emptied through the return line 10. The axial height of the opening 22 thus forms the lower limit of the filter receiving space 4. To simplify the insertion of the ring-shaped filter insert 5 into the filter housing 2, a ramp is formed on the function carrier insert 7, its lower end beginning at the opening 22 of the emptying channel 21 at the axial height of this opening. The ramp 25 then rises along its ramp length in the axial direction into the filter receiving space 4, ending again at the opening 22, but at a higher axial level. The ramp 25 thus has a helical shape with a single winding which is essentially complete.

Between the individual function elements of the function carrier insert 7, such as the inlet channel section 14, outlet channel 19, central connection 17, ramp 25, emptying channel 21, there are webs 26 by means of which the function elements of the function carrier insert are interconnected. In a preferred embodiment, the function carrier insert 7 is made mostly of plastic, especially by an injection molding method.

In an alternative embodiment according to FIG. 2, an essentially H-shaped component 27 may be designed as an additional function element, which can be connected at the connections 12 and 13 of the outlet channel 19 or the emptying channel 21 by a plug connection. In this way, the emptying channel 21 is lengthened by an emptying channel section 28 and an outlet channel 19 is lengthened by an outlet channel section 29; these in turn have corresponding connections 12' and 13'. Component 27 also has a pressure-regulating valve 30 which creates a connection between the emptying channel section 28 and the outlet channel section 29, depending on the pressure, to permit a pressure release in the return line 10 when there is a critical increase in pressure on the clean side. It is clear that when using this component 27, the connection of the inlet channel section 14 is also connected to the inlet line 8 through a corresponding extension piece or the channels 19 and 21 are shortened accordingly.

The connections 11, 12, 13 of the inlet channel section 14, the emptying channel 21 and the outlet channel 19 can each be inserted axially into the respective openings of the inlet line 8, the return line 10 and the outlet line 9, so that the function carrier insert 7 can be inserted into the filter housing 2 in the axial direction. Similarly, the ring-shaped filter insert 5 can also be attached to the function carrier insert 7 in the axial direction, with the central connection 17 penetrating into the central opening in the end disk 18 at the one end and the journal 23 penetrating into the opening 20 in the emptying channel 21 on the other end.

What is claimed is:

1. An oil filter for cleaning lubricating oil for an internal combustion engine, comprising:
   a) a filter housing which is arranged essentially upright in an installed state and which has an upper section, and a filter receiving space disposed in said upper section and a lower section having an oil inlet socket and an oil outlet socket and an oil return socket;
   b) a ring shaped filter insert having a lower section for insertion into said filter receiving space, said ring shaped filter insert having a clean side and an unclean side;
   c) a function carrier insert arranged in said filter housing comprising
      i) an outlet channel conduit having a top end sealingly attached to said clean side of said ring shaped filter, and a bottom end sealingly received within the oil outlet socket for letting cleaned liquid out of said clean side of said ring shaped filter insert,
      ii) an emptying channel conduit having a bottom end sealingly received within the oil return socket, and a top end which is blocked by a member carried by said ring shaped filter insert, but is opened when said ring shaped insert is removed to allow the liquid to run out of said filter receiving space, and
      iii) an oil inlet channel conduit having a bottom end sealingly received within the oil inlet socket, and a return flow blocking valve which is in fluid communication with the inlet channel and blocks a return flow of liquid out of said unclean side of said ring shaped filter insert, wherein said outlet channel conduit, said emptying channel conduit, said oil inlet channel conduit, and said return flow blocking valve are rigidly connected to each other such that said function carrier insert can be inserted into the lower section of the housing as an integral unit.

2. The oil filter according to claim 1 wherein the outlet channel communicates with a central interior of said ring-shaped filter insert, and wherein the inlet channel directs unclean liquid to the unclean side of said ring-shaped filter insert.

3. The oil filter according to claim 1, wherein said function carrier insert comprises a bypass valve which connects the inlet channel to the outlet channel via said unclean side as a function of pressure.

4. A liquid filter according to claim 1 characterized in that the function carrier insert (7) is made of plastic.

5. The oil filter according to claim 1 wherein each of said inlet channel conduit, said outlet channel conduit, and said emptying channel conduit of said function carrier insert are coupled to the corresponding oil inlet socket, oil outlet socket, and oil return socket provided in a bottom of said filter housing via a respective plug connection.

6. An oil filter for cleaning lubricating oil for an internal combustion engine, comprising:
   a) a filter housing which is arranged essentially upright in an installed state and which has an upper section, and a filter receiving space disposed in said upper section and a lower section having an oil inlet socket and an oil outlet socket and an oil return socket;
   b) a ring shaped filter insert having a lower section for insertion into said filter receiving space, said ring shaped filter insert having a clean side and an unclean side;
   c) a function carrier insert arranged in said filter housing comprising
      i) an outlet channel conduit having a top end sealingly attached to said clean side of said ring shaped filter, and a bottom end sealingly received within the oil outlet socket for letting cleaned liquid out of said clean side of said ring shaped filter insert.

7. An oil filter for cleaning lubricating oil for an internal combustion engine, containing an oil inlet line, an oil outlet line, and an oil return line coupled to the filter, the oil filter comprising:
   a) a filter housing which is arranged essentially upright in an installed state and which has an upper section, and a filter receiving space disposed in said upper section and a lower section having an outlet socket for receiving the oil outlet line and a return socket for receiving the oil return line;
   b) a ring shaped filter insert having a lower section for insertion into said filter receiving space, said ring shape filter insert having a clean side and an unclean side;
   c) an inlet channel disposed in said lower section of said ring shaped filter insert, and couple to the oil inlet line, for receiving unclean liquid from the oil inlet line and for feeding said unclean liquid into said unclean side of said ring shape filter; and
   d) at least one function carrier insert arranged in said filter housing and comprising;
      i) an outlet channel having a top and sealingly attached to said clean side of said ring shape filter, and a bottom end sealingly attached to the oil outlet line for letting cleaned liquid out of said clean side of said ring shaped filter insert; and
      ii) at least one return flow blocking valve which is in fluid communication with said inlet channel and blocks a return flow of liquid out of said unclean side of said ring shape filter insert and out of the oil inlet line,
      ii) an emptying channel conduit having a bottom end sealingly received within the oil return socket, and a top end which is blocked by a member carried by said ring shaped filter insert, but is opened when said ring shaped insert is removed to allow the liquid to run out of said filter receiving space, and
      iii) an oil inlet channel conduit having a bottom end sealingly received within the oil inlet socket, wherein said said outlet channel conduit, said emptying channel conduit, and said oil inlet channel conduit are rigidly connected to each other such that said function carrier insert can be inserted into the lower section of the housing as an integral unit.

8. An oil filter for cleaning lubricating oil for an internal combustion engine, comprising:
   a) a filter housing which is arranged essentially upright in an installed state and which has an upper section, and a filter receiving space disposed in said upper section and a lower section having an oil inlet socket and an oil outlet socket and an oil return socket and;
   b) a ring shaped filter insert having a lower section for insertion into said filter receiving space, said ring shaped filter insert having a clean side and an unclean side;
   c) a function carrier insert arranged in said filter housing comprising
      i) an outlet channel conduit having a top end sealingly attached to said clean side of said ring shaped filter, and a bottom end sealingly received within the oil outlet socket for letting cleaned liquid out of said clean side of said ring shaped filter insert, and ii) an oil inlet channel conduit having a bottom end sealingly received within the oil inlet socket, and a return flow blocking valve which is in fluid communication with the inlet channel and blocks a return flow of liquid out of said unclean side of said ring shaped filter insert, wherein said outlet channel conduit, said oil inlet channel conduit, and said return flow blocking valve are rigidly connected to each other such that said function carrier insert can be inserted into the lower section of the housing as an integral unit.

9. The oil filter according to claim 8, wherein said pressure-regulating valve is attached to said outlet channel conduit and said emptying channel conduit on a lower side of said function carrier insert such that said pressure-regulating valve and said outlet channel conduit and said emptying channel conduit together define an H-shaped configuration.

10. An oil filter for cleaning lubricating oil for an internal combustion engine, comprising:
   a) a filter housing which is arranged essentially upright in an installed state and which has an upper section, and a filter receiving space disposed in said upper section and a lower section having an oil inlet socket and an oil outlet socket and an oil return socket;
   b) a ring shaped filter insert having a lower section for insertion into said filter receiving space, said ring shaped filter insert having a clean side and an unclean side; and
   c) a function carrier insert arranged in said filter housing comprising
      i) an outlet channel conduit having a top end sealingly attached to said clean side of said ring shaped filter, and a bottom end sealingly received within the oil outlet socket for letting cleaned liquid out of said clean side of said ring shaped filter insert,
      ii) an emptying channel conduit having a bottom end sealingly received within the oil return socket, and a top end which is blocked by said ring shaped filter insert, but is opened when said ring shaped insert is removed to allow the liquid to run out of said filter receiving space,
      iii) an oil inlet channel conduit having a bottom end sealingly received within the oil inlet socket,
      iv) an eccentric journal mounted eccentrically on said ring shaped filter insert and projecting axially downward so that when said ring shaped filter insert is inserted into said filter receiving space, said journal penetrates into an opening in said emptying channel and seals said emptying channel, and
      v) a ramp, which begins at a lower end of said opening in said emptying channel in an axial plane of said emptying channel and rises into an interior of said filter receiving space with an increase in a ramp length, wherein said ramp is positioned in said housing so that when said ring shaped filter insert is inserted into said filter housing said eccentric journal can rest on said ramp and the be guided into said emptying channel opening by sliding downward on said ramp via rotation of said ring shaped channel insert, wherein said outlet channel conduit, said emptying channel conduit, said oil inlet channel conduit, and said ramp are rigidly connected to each other such that said function carrier insert can be inserted into the lower section of the housing as an integral unit.

* * * * *